US009607625B2

(12) United States Patent
Chen et al.

(10) Patent No.: US 9,607,625 B2
(45) Date of Patent: Mar. 28, 2017

(54) SYSTEMS AND METHODS FOR AUDIO ENCODING AND DECODING

(71) Applicant: Tencent Technology (Shenzhen) Company Limited, Shenzhen (CN)

(72) Inventors: Guoming Chen, Shenzhen (CN); Yuanjiang Peng, Shenzhen (CN); Wenjun Ou, Shenzhen (CN); Chao Peng, Shenzhen (CN); Hong Liu, Shenzhen (CN); Xingping Long, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 0 days.

(21) Appl. No.: 14/816,673

(22) Filed: Aug. 3, 2015

(65) Prior Publication Data

US 2015/0340046 A1  Nov. 26, 2015

Related U.S. Application Data

(63) Continuation of application No. PCT/CN2013/088857, filed on Dec. 9, 2013.

(30) Foreign Application Priority Data

Jun. 3, 2013 (CN) .......................... 2013 1 0216510

(51) Int. Cl.
*G10L 19/032* (2013.01)
*H04L 1/00* (2006.01)
(Continued)

(52) U.S. Cl.
CPC .............. *G10L 19/032* (2013.01); *H04L 1/00* (2013.01); *G10L 19/008* (2013.01); *H04L 1/1867* (2013.01)

(58) Field of Classification Search
CPC combination set(s) only.
See application file for complete search history.

(56) References Cited

U.S. PATENT DOCUMENTS 8,086,452 B2 * 12/2011 Yoshida ................ G10L 19/005
704/227
2004/0128128 A1 * 7/2004 Wang .................... G10L 19/005
704/229
(Continued)

FOREIGN PATENT DOCUMENTS

CN  102522092 A  6/2012
CN  103280222 A  9/2013
(Continued)

OTHER PUBLICATIONS

Patent Cooperation Treaty, International Search Report and Written Opinion of the International Searching Authority, mailed Mar. 13, 2014, in PCT/CN2013/088857.
(Continued)

*Primary Examiner* — Abul Azad
(74) *Attorney, Agent, or Firm* — Jones Day

(57) ABSTRACT

Systems and methods are provided for audio encoding. For example, first quantization encoding is performed on audio data associated with a current frame of an audio data stream to obtain first quantization-encoded data; second quantization encoding is performed on the audio data to obtain second quantization-encoded data; the first quantization-encoded data is coupled to the current frame of the audio data stream; and the second quantization-encoded data is coupled to a next frame of the audio data stream.

8 Claims, 11 Drawing Sheets

(51) Int. Cl.
 *G10L 19/008* (2013.01)
 *H04L 1/18* (2006.01)

(56) References Cited

U.S. PATENT DOCUMENTS

| | | | | |
|---|---|---|---|---|
| 2007/0147518 A1* | 6/2007 | Bessette | ............... | G10L 19/0212 375/243 |
| 2007/0271101 A1* | 11/2007 | Sato | ....................... | G10L 19/005 704/268 |
| 2009/0271204 A1* | 10/2009 | Tammi | ................ | G10L 19/0208 704/500 |
| 2010/0250260 A1* | 9/2010 | Laaksonen | ............. | G10L 21/038 704/500 |
| 2012/0209600 A1* | 8/2012 | Kim | ....................... | G10L 19/025 704/219 |

FOREIGN PATENT DOCUMENTS

| | | |
|---|---|---|
| WO | WO 2006/117264 A1 | 11/2006 |
| WO | WO 2011/013980 A2 | 2/2011 |

OTHER PUBLICATIONS

Patent Cooperation Treaty, International Preliminary Report on Patentability, issued Dec. 8, 2015, in PCT/CN2013/088857.

\* cited by examiner

SYSTEMS AND METHODS FOR AUDIO ENCODING AND DECODING

CROSS-REFERENCES TO RELATED APPLICATIONS

This application is a continuation of International Application No. PCT/CN2013/088857, with an international filing date of Dec. 9, 2013, now pending, which claims priority to Chinese Patent Application No. 201310216510.8, filed Jun. 3, 2013, both applications being incorporated by reference herein for all purposes.

BACKGROUND OF THE INVENTION

Certain embodiments of the present invention are directed to computer technology. More particularly, some embodiments of the invention provide systems and methods for signal processing. Merely by way of example, some embodiments of the invention have been applied to audio signals. But it would be recognized that the invention has a much broader range of applicability.

Two main factors, namely packet loss and latency, usually affect the quality of audio signals over an IP network. As a result of time-varying network conditions, the delay introduced by the processing at different nodes and/or terminals often leads to random time delay and packet loss. In order to improve network audio quality, packet loss compensation is often adopted to compensate for lost audio packets.

Currently, there are many audio packet loss compensation methods, such as: retransmission by a transmission terminal (i.e., to retransmit data packets upon confirmation that the data packets are lost), interleaving by a transmission terminal (i.e., to adjust a time sequence of data packets to be sent to reduce the impact of unexpected packet loss), silence substitution by a decoding terminal (i.e., to use silence to substitute lost data packets), data splicing (i.e., to directly splice together audio data before and after the lost data packets), packet duplication (i.e. to use an immediately preceding data packet to replace a current lost data packet), waveform interpolation (i.e., to use preceding and succeeding data packets to recover the lost data packets through interpolation), and model-based recovery (i.e., to construct a speech model or an audio model to recover the lost data packets).

The above-noted conventional methods have some disadvantages. For example, retransmission by the transmission terminal often needs retransmission of the entire lost data frame which usually greatly increases network transmission delay and end-to-end latency. Other above-noted methods often negatively affect the quality of reconstructed audio data.

Hence it is highly desirable to improve the techniques for audio coding.

BRIEF SUMMARY OF THE INVENTION

According to one embodiment, a method is provided for audio encoding. For example, first quantization encoding is performed on audio data associated with a current frame of an audio data stream to obtain first quantization-encoded data; second quantization encoding is performed on the audio data to obtain second quantization-encoded data; the first quantization-encoded data is coupled to the current frame of the audio data stream; and the second quantization-encoded data is coupled to a next frame of the audio data stream.

According to another embodiment, a method is provided for audio decoding. For example, an audio data stream, a current frame of the audio data stream including first quantization-encoded data corresponding to audio data associated with the current frame, a next frame of the audio data stream including second quantization-encoded data corresponding to the audio data associated with the current frame are obtained; whether the current frame of the audio data stream is lost is determined; in response to the current frame of the audio data stream not being lost, the first quantization-encoded data is obtained from the current frame of the audio data stream and the first quantization-encoded data is decoded to obtain the audio data associated with the current frame; in response to the current frame of the audio data stream being lost, the second quantization-encoded data is obtained from the next frame of the audio data stream and the second quantization-encoded data is decoded to obtain the audio data associated with the current frame.

According to yet another embodiment, an audio-encoding system includes: a first quantization-encoding module, a second quantization-encoding module, and a first data-synthesis module. The first quantization-encoding module is configured to perform first quantization encoding on audio data associated with a current frame of an audio data stream to obtain first quantization-encoded data. The second quantization-encoding module is configured to perform second quantization encoding on the audio data to obtain second quantization-encoded data. The first data-synthesis module is configured to couple the first quantization-encoded data to the current frame of the audio data stream and couple the second quantization-encoded data to a next frame of the audio data stream.

In one embodiment, an audio-decoding system includes: a stream-acquisition module, a determination module, a first quantization-decoding module and a second quantization-decoding module. The stream-acquisition module is configured to obtain an audio data stream, a current frame of the audio data stream including first quantization-encoded data corresponding to audio data associated with the current frame, a next frame of the audio data stream including second quantization-encoded data corresponding to the audio data associated with the current frame. The determination module is configured to determine whether the current frame of the audio data stream is lost. The first quantization-decoding module is configured to, in response to the current frame of the audio data stream not being lost, obtain the first quantization-encoded data from the current frame of the audio data stream and decode the first quantization-encoded data to obtain the audio data associated with the current frame. The second quantization-decoding module is configured to, in response to the current frame of the audio data stream being lost, obtain the second quantization-encoded data from the next frame of the audio data stream and decode the second quantization-encoded data to obtain the audio data associated with the current frame.

In another embodiment, a non-transitory computer readable storage medium includes programming instructions for audio encoding. The programming instructions are configured to cause one or more data processors to execute certain operations. For example, first quantization encoding is performed on audio data associated with a current frame of an audio data stream to obtain first quantization-encoded data; second quantization encoding is performed on the audio data to obtain second quantization-encoded data; the first quantization-encoded data is coupled to the current frame of the audio data stream; and the second quantization-encoded data is coupled to a next frame of the audio data stream.

In yet another embodiment, a non-transitory computer readable storage medium includes programming instructions for audio decoding. The programming instructions are configured to cause one or more data processors to execute certain operations. For example, an audio data stream, a current frame of the audio data stream including first quantization-encoded data corresponding to audio data associated with the current frame, a next frame of the audio data stream including second quantization-encoded data corresponding to the audio data associated with the current frame are obtained; whether the current frame of the audio data stream is lost is determined; in response to the current frame of the audio data stream not being lost, the first quantization-encoded data is obtained from the current frame of the audio data stream and the first quantization-encoded data is decoded to obtain the audio data associated with the current frame; in response to the current frame of the audio data stream being lost, the second quantization-encoded data is obtained from the next frame of the audio data stream and the second quantization-encoded data is decoded to obtain the audio data associated with the current frame.

Depending upon embodiment, one or more benefits may be achieved. These benefits and various additional objects, features and advantages of the present invention can be fully appreciated with reference to the detailed description and accompanying drawings that follow.

DETAILED DESCRIPTION OF THE INVENTION

Figure 1:
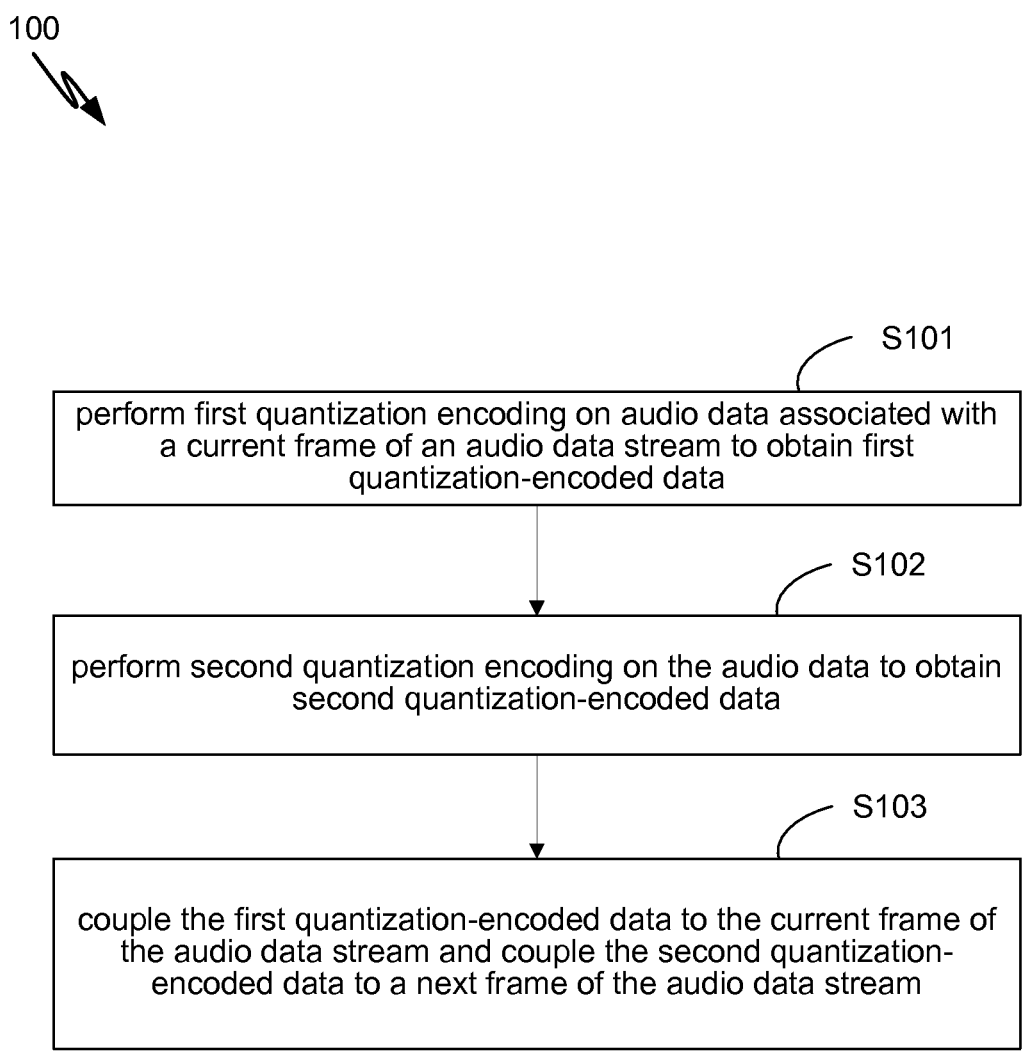
FIG. 1 is a simplified diagram showing a method for audio encoding according to one embodiment of the present invention.

FIG. 1 is a simplified diagram showing a method for audio encoding according to one embodiment of the present invention. This diagram is merely an example, which should not unduly limit the scope of the claims. One of ordinary skill in the art would recognize many variations, alternatives, and modifications. The method 100 includes at least the processes S101-S103.

According to one embodiment, the process S101 includes: performing first quantization encoding on audio data associated with a current frame of an audio data stream to obtain first quantization-encoded data. For example, the process S102 includes: performing second quantization encoding on the audio data to obtain second quantization-encoded data. In another example, the process S103 includes: coupling the first quantization-encoded data to the current frame of the audio data stream, and coupling the second quantization-encoded data to a next frame of the audio data stream.

According to another embodiment, two quantization encoding processes are carried out on the audio data, and the encoded data obtained from the two quantization encoding processes are coupled to the current frame and the next frame of the audio data stream. For example, when a decoding terminal discovers packet loss associated with the current frame, the decoding terminal can still obtain the current frame of the audio data by decoding the second quantization-encoded data in the next frame, and the retransmission of the entire lost frame of audio data is not necessary, which results in little impact on network latency and satisfactory restoration quality of the audio data.

According to yet another embodiment, during the processes S101 and S102, the first quantization encoding is carried out on the audio data and the first quantization encoding includes various audio data quantization methods. For example, the audio data includes mono audio data, stereo audio data and audio data obtained under different sampling rates with different frame lengths. For example, the first quantization encoding and the second quantization encoding are implemented based on a preset bit rate and a preset encoding bandwidth, and the first quantization-encoded data and the second quantization-encoded data represent core encoding information of the audio data. Thus, the corresponding audio data can be obtained by decoding either the first quantization-encoded data or the second quantization-encoded data, in some embodiments.

In one embodiment, the bit rates and the encoding bandwidths of the first quantization encoding and the second quantization encoding are generally set based on certain parameters, such as the bandwidth of a transmission channel and processing capacity of a transmission terminal and a reception terminal. As an example, the bit rate of the first quantization encoding is set to be larger than the bit rate of the second quantization encoding. Therefore, the number of bits in the second quantization-encoded data obtained from the second quantization encoding is less than the number of bits in the first quantization-encoded data obtained from the first quantization encoding, in certain embodiments. For example, the second quantization-encoded data is coupled to the next data frame of the audio data stream in the form of FEC (Forward Error Concealment) data and the second quantization-encoded data has less number of bits. Thus, including the second quantization-encoded data in the audio data stream does not significantly increase the occupancy of the communication bandwidth, and the audio data can still be accurately recovered in the case of data frame loss.

In another embodiment, frequency-domain-encoding bandwidths of both the first quantization-encoded data and the second quantization-encoded data are the same, thus there is not much audible differences between audio data obtained through the decoding of the second quantization-encoded data and audio data obtained through the decoding of the first quantization-encoded data. For example, even if any data packets are lost during the transmission of the audio data, the decoding terminal is still able to receive good-quality audio data. As an example, the bit rate of the first quantization encoding is set to be larger than the bit rate of the second quantization encoding, and the frequency-domain-encoding bandwidths of both the first quantization encoding and the second quantization encoding are the same, so as to ensure that the occupancy of the communication bandwidth would not increase significantly and the decoding terminal receives good-quality audio data.

In yet another embodiment, the method 100 further includes, before the processes S101 and S102, a process for performing QMF (Quadrature Mirror Filter) filtering on the audio data to decompose the audio data into one or more sub-bands. For example, while the first quantization encoding and the second quantization encoding are carried out on each sub-band, coding-high-pass sub-bands of both the first quantization encoding and the second quantization encoding are the same. As an example, in operation, time-domain signals related to the audio data can be decomposed into several sub-bands (e.g., 64 sub-bands) using a QMF filter bank to ensure that the coding-high-pass sub-bands (i.e., Band_high) of the first quantization encoding and the second quantization encoding are the same under different coding bit rates. As another example, the encoding bandwidths of the first quantization encoding and the second quantization encoding are the same, where the encoding bandwidth=(Band_high*sampling rate/total number of sub-bands+1)>>1.

In some embodiments, the method 100 further includes, before the processes S101 and S102, pre-processing operations on the audio data before performing encoding. For example, the pre-processing operations include one or more of the following: performing down-mixing on the audio data, performing down-sampling on the audio data, or performing MDCT (modified discrete cosine transform) on the audio data to transform the audio signals from the time domain to the frequency domain. As an example, during the pre-processing operations, stereo audio signals are transformed into mono audio signals through down-mixing in order to facilitate the extraction of core coding information during the encoding process. As another example, through down-sampling (e.g., twice down-sampling), the sampling rate of the audio data can be lowered and the burden on the bandwidths during data transmission can be reduced. The audio data is transformed from the time domain to the frequency domain through MDCT so as to make it more suitable for encoding applications and improve the quality and efficiency of audio encoding, in some embodiments.

In certain embodiments, during the process S103, the first quantization-encoded data corresponding to the audio data associated with the current frame is coupled to the current frame of the audio data stream. For example, if there is no frame loss when the decoding terminal receives the audio data stream, the decoding terminal can extract the first quantization-encoded data from the current frame of the audio data stream and decode the first quantization-encoded data to obtain the audio data corresponding to the current frame. As an example, the second quantization-encoded data corresponding to the audio data associated with the current frame is coupled to the next frame of the audio data stream. As another example, if the current frame is lost when the decoding terminal receives the audio data stream, the decoding terminal can extract the second quantization-encoded data from the next frame of current frame and decode the second quantization-encoded data to obtain the corresponding audio data associated with the current frame. In yet another example, redundant coded flags can be further set up in the audio data stream during the generation of the audio data stream. After receiving the audio data stream, the decoding terminal can first read the redundant coded flags in the stream and determine whether frame-loss-compensation encoding has been performed at the encoding terminal based on the redundant coded flags, so that the decoding terminal can select an appropriate decoding method.

Figure 2:
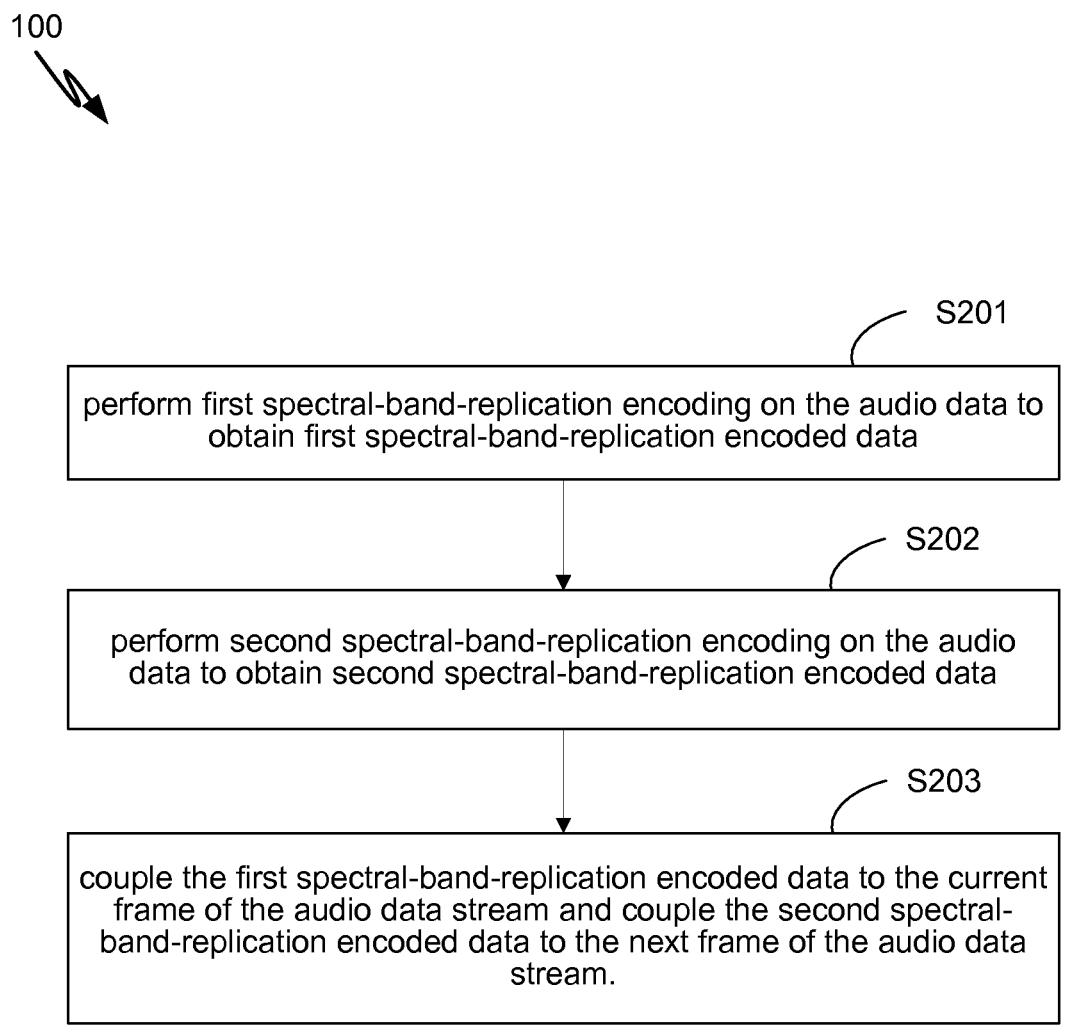
FIG. 2 is a simplified diagram showing a method for audio encoding according to another embodiment of the present invention.

FIG. 2 is a simplified diagram showing the method 100 for audio encoding according to another embodiment of the present invention. This diagram is merely an example, which should not unduly limit the scope of the claims. One of ordinary skill in the art would recognize many variations, alternatives, and modifications. The method 100 further includes at least the processes S201-S203.

According to one embodiment, the process S201 includes: performing first spectral-band-replication encoding on the audio data to obtain first spectral-band-replication encoded data. For example, the process S202 includes: performing second spectral-band-replication encoding on the audio data to obtain second spectral-band-replication encoded data. In another example, the process S203 includes: coupling the first spectral-band-replication encoded data to the current frame of the audio data stream and coupling the second spectral-band-replication encoded data to the next frame of the audio data stream.

According to another embodiment, the spectral-band-replication encoded data refers to a set of parameters obtained after performing the spectral-band-replication encoding. For example, to save bandwidth, the encoding terminal converts audio signals to low-frequency signals for transmission. As an example, the spectral-band-replication encoded data obtained through the spectral-band-replication encoding is added to the audio data stream to be transmitted. In another example, when the spectral-band-replication encoded data is being decoded at the decoding terminal, the decoding terminal can restore the audio signals to high-frequency signals based on the spectral-band-replication encoded data.

According to yet another embodiment, the first spectral-band-replication encoding and the second spectral-band-replication encoding are carried out on the audio data to obtain the first spectral-band-replication encoded data and the second spectral-band-replication encoded data respectively. For example, the first spectral-band-replication encoded data corresponding to the audio data associated with the current frame is coupled to the current frame of the audio data stream and the second spectral-band-replication encoded data corresponding to the audio data associated with the current frame is coupled to the next frame of the audio data stream. In another example, if the current frame of the audio data stream is not lost, the decoding terminal can extract the first quantization-encoded data and the first spectral-band-replication encoded data from the current frame of the audio data stream, perform decoding to obtain the audio data associated with the current frame corresponding to the first quantization-encoded data and perform band recovery on the audio data based on the first spectral-band-replication encoded data. In yet another example, if the current frame of the audio data stream is lost, the decoding terminal can extract the second quantization-encoded data and the second spectral-band-replication encoded data from the next frame, perform decoding to obtain the audio data associated with the current frame corresponding to the second quantization-encoded data and perform band recovery on the audio data based on the second spectral-band-replication encoded data. In yet another example, the bit rate of the first spectral-band-replication encoding is larger than the bit rate of the second spectral-band-replication encoding. In yet another example, the frequency-domain-encoding bandwidths of both the first spectral-band-replication encoding and the second spectral-band-replication encoding are the same.

In some embodiments, as the bit rate of the first spectral-band-replication encoding is larger than the second spectral-band-replication encoding, the number of bits in the second spectral-band-replication encoded data obtained through the second spectral-band-replication encoding is less than the number of bits in first spectral-band-replication encoded data obtained through the first spectral-band-replication encoding, and thus the second spectral-band-replication encoded data takes up less communication bandwidth. For example, as the frequency encoding bandwidths of both the first spectral-band-replication encoding and second spectral-band-replication encoding are the same, spectral-band-replication data obtained from decoding the first spectral-band-replication encoded data and spectral-band-replication data obtained from decoding the second spectral-band-replication encoded data are basically the same. Thus, even if packet loss occurs in audio-data transmission, the decoding terminal can still obtain good-quality audio data.

Figure 3:
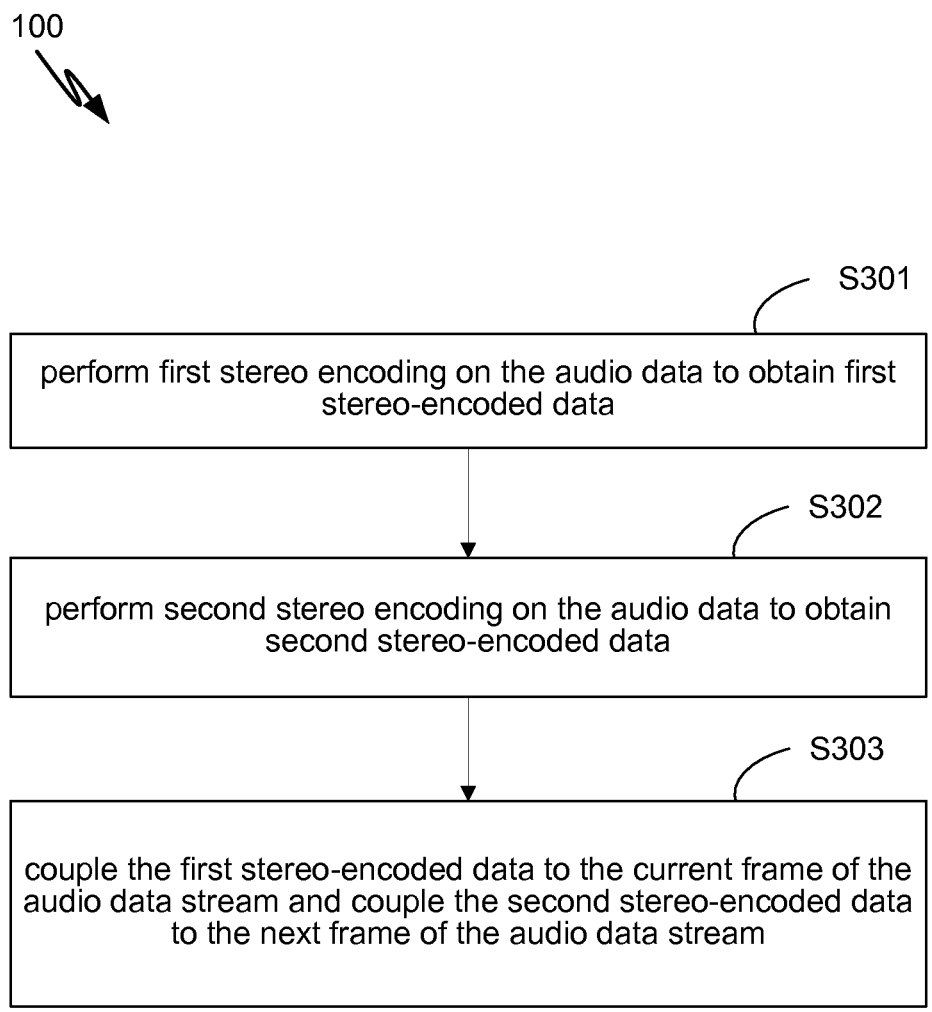
FIG. 3 is a simplified diagram showing a method for audio encoding according to yet another embodiment of the present invention.

FIG. 3 is a simplified diagram showing the method 100 for audio encoding according to yet another embodiment of the present invention. This diagram is merely an example, which should not unduly limit the scope of the claims. One of ordinary skill in the art would recognize many variations, alternatives, and modifications. The method 100 further includes at least the processes S301-S303.

According to one embodiment, the process S301 includes: performing first stereo encoding on the audio data to obtain first stereo-encoded data. For example, the process S302 includes: performing second stereo encoding on the audio data to obtain second stereo-encoded data. In another example, the process S303 includes: coupling the first stereo-encoded data to the current frame of the audio data stream and coupling the second stereo-encoded data to the next frame of the audio data stream.

According to another embodiment, stereo-encoded data includes audio-signal-strength difference of different audio channels (e.g., two or more channels), correlation information etc. For example, if the current frame of the audio data stream is not lost, the first quantization-encoded data and the first stereo-encoded data can be extracted from the current frame of the audio data stream, then decoding can be carried out to obtain the audio data associated with the current frame corresponding to the first quantization-encoded data and stereo restoration can be carried out on the audio data based on the first stereo-encoded data. In another example, if the current frame of the audio data stream is lost, the second quantization-encoded data and the second stereo-encoded data can be extracted from the next frame, then decoding can be carried out to obtain the audio data associated with the current frame corresponding to the second quantization-encoded data and stereo restoration can be carried out on the audio data based on the second stereo-encoded data.

In some embodiments, the method 100 is implemented as follows: separately performing the first quantization encoding, the first spectral-band-replication encoding and the first stereo encoding on the audio data associated with the current frame; coupling the first quantization-encoded data, the first spectral-band-replication encoded data and the first stereo-encoded data corresponding to the audio data associated with the current frame to the current frame of the audio data stream; separately performing the second quantization encoding, the second spectral-band-replication encoding and the second stereo encoding on the audio data associated with the current frame; coupling the second quantization-encoded data, the second spectral-band-replication encoded data and the second stereo-encoded data corresponding to the audio data associated with the current frame to the next frame of the audio data stream.

Figure 4:
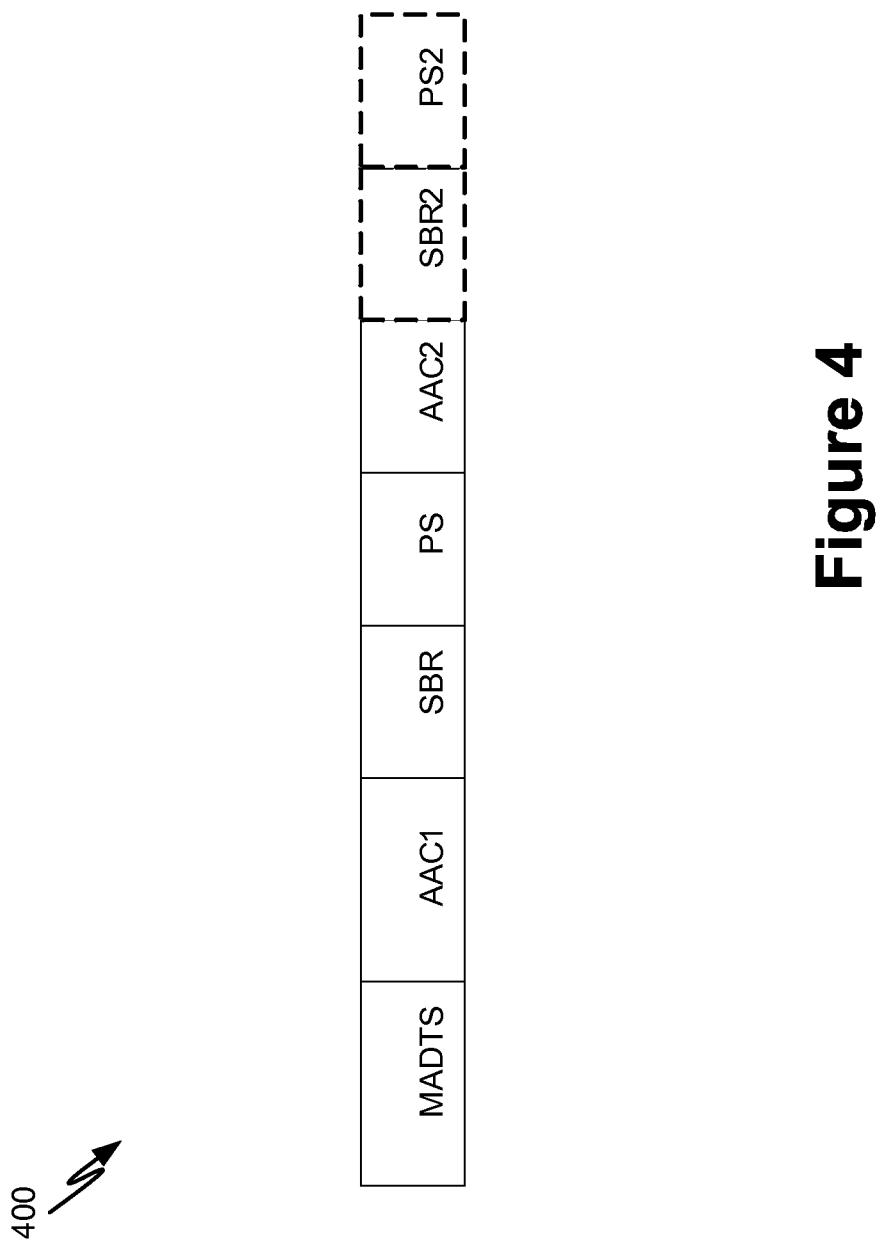
FIG. 4 is a simplified diagram showing a frame of an audio data stream for audio encoding according to one embodiment of the present invention.

FIG. 4 is a simplified diagram showing a frame of an audio data stream for audio encoding according to one embodiment of the present invention. This diagram is merely an example, which should not unduly limit the scope of the claims. One of ordinary skill in the art would recognize many variations, alternatives, and modifications.

According to one embodiment, the frame 400 includes multiple fields. For example, MDTS represents a modified ADTS header in which one data bit is set as a redundant coded flag. In another example, ACC1 represents a bit for coupling the first quantization-encoded data, SBR1 represents a bit for coupling the first spectral-band-replication encoded data, and PS1 represents a bit for coupling the first stereo-encoded data. In yet another example, ACC2 represents a bit for coupling the second quantization-encoded data, SBR2 represents a bit for coupling the second spectral-band-replication encoded data, and PS2 represents a bit for coupling the second stereo-encoded data. SBR2 and/or PS2 can be set based on needs.

According to another embodiment, if the current frame is not lost after the decoding terminal receives the audio data stream, the current frame of data is stored. For example, upon receiving or reading the next frame, the ACC1 bit, the SBR1 bit and the PS1 bit are obtained from audio data associated with the stored current frame. In another example, decoding is performed based on the first quantization-encoded data, the first spectral-band-replication encoded data and the first stereo-encoded data to obtain the audio data associated with the current frame, and band recovery and stereo restoration are carried out on the audio data associated with the current frame. In another example, if the current frame is lost, upon receiving or reading the next frame, the ACC2 bit, the SBR2 bit and the PS2 bit obtained from audio data associated with the next frame. In yet another example, decoding is performed based on the second quantization-encoded data, the second spectral-band-replication encoded data and the second stereo-encoded data to obtain the audio data associated with the current frame, and band recovery and stereo restoration are carried out on the audio data associated with the current frame.

Figure 5:
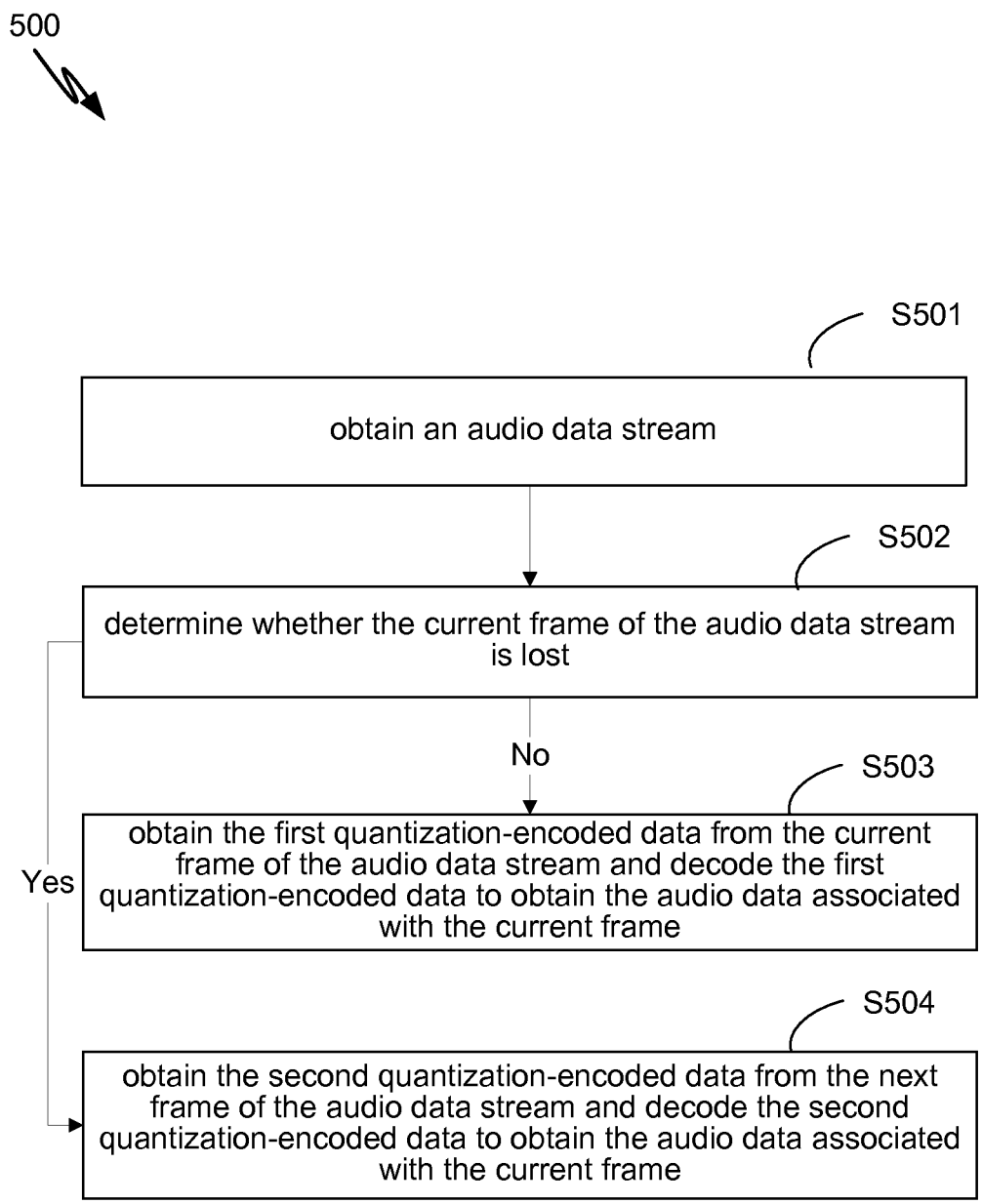
FIG. 5 is a simplified diagram showing a method for audio decoding according to one embodiment of the present invention.

FIG. 5 is a simplified diagram showing a method for audio decoding according to one embodiment of the present invention. This diagram is merely an example, which should not unduly limit the scope of the claims. One of ordinary skill in the art would recognize many variations, alternatives, and modifications. The method 500 includes at least the processes S501-S504.

According to one embodiment, the process S501 includes: obtaining an audio data stream, a current frame of the audio data stream including first quantization-encoded data corresponding to audio data associated with the current frame, a next frame of the audio data stream including second quantization-encoded data corresponding to the audio data associated with the current frame. For example, the process S502 includes: determining whether the current frame of the audio data stream is lost. As an example, if the current frame is not lost, then the process S503 is executed. Otherwise, the process S504 is executed. As another example, the process S503 includes: obtaining the first quantization-encoded data from the current frame of the audio data stream and decoding the first quantization-encoded data to obtain the audio data associated with the current frame. As yet another example, the process S504 includes: obtaining the second quantization-encoded data from the next frame of the audio data stream and decoding the second quantization-encoded data to obtain the audio data associated with the current frame.

According to another embodiment, the audio data stream is obtained during the process S501. For example, the audio data stream includes the first quantization-encoded data and the second quantization-encoded data which are obtained after the encoding terminal separately carries out the first quantization encoding and the second quantization encoding on audio data. As an example, the first quantization-encoded data corresponding to the audio data associated with the current frame is coupled to the current frame of the audio data stream, and the second quantization-encoded data is coupled to the next frame of the audio data stream. In another example, the second quantization-encoded data corresponds to the FEC (Forward Error Concealment) data of the audio data. In yet another example, when the first quantization-encoded data is lost, the audio data may be obtained through decoding the second quantization-encoded data.

In one embodiment, during the process S502, whether the current frame of the obtained audio data stream is lost is determined. For example, the determination of whether the current frame of the audio data stream is lost can be carried out by reading the frame loss flag of the audio data stream, or through other known methods. As an example, a commonly used frame loss flag is m_prev_lost_flag, where m_prev_lost_flag=0 indicates that the previous frame is not lost and m_prev_lost_flag=1 indicates that the previous frame is lost. Therefore, the determination of whether the current frame is lost can be carried out by determining whether the frame loss flag, m_prev_lost_flag, is equal to 1 upon receiving the next frame, in some embodiments.

In another embodiment, the decoding terminal is configured to delay outputting the audio data by 1 frame. For example, upon receiving the next frame of the audio data stream, then the decoding terminal decodes to obtain the audio data associated with the current frame. As an example, the process for obtaining the audio data associated with the current frame includes: storing the current frame of the audio data stream; upon reception of the next frame of the audio data stream, obtaining the first quantization-encoded data from the stored current frame of the audio data stream and decoding the first quantization-encoded data to obtain the audio data associated with the current frame.

In yet another embodiment, if the current frame corresponds to a first frame of the audio data stream, the output of the decoding terminal includes all 0 data. For example, upon reception of the audio data stream, it is determined whether the current frame is the first frame and the determination may be carried out based on whether another flag, m_first_frame_dec_flag, of the audio data stream is 1. As an example, if m_first_frame_dec_flag=1, it indicates that the current frame is the first frame of data, then the current frame is stored and the output includes all 0 data. If m_first_frame_dec_flag=0, it indicates that the current frame is not the first frame of data, then further determination is carried out to check whether m_prev_lost_flag is 0. In another example, if m_prev_lost_flag=1, the second quantization-encoded data is obtained from the next frame and decoded to obtain the audio data associated with the current frame and m_prev_lost_flag is shift backward by 1 bit. In yet another example, if m_prev_lost_flag=0, the first quantization-encoded data is obtained from the current frame and decoded to obtain the audio data associated with the current frame and m_prev_lost_flag is shift backward by 1 bit. Delaying the audio data output from the decoding terminal by one frame can reduce the occurrence of audio interruptions caused by packet loss, in some embodiments. For example, if both the current frame and the next frame of the audio data stream are lost, waveform interpolation, packet duplication or model-based recovery may be adopted to perform packet loss compensation on the audio data associated with the current frame.

In certain embodiments, the method 500 is implemented to first determine whether the current frame of the audio data stream is lost. For example, if the current frame is not lost, the first quantization-encoded data is directly obtained from the current frame and decoded to obtain the audio data associated with the current frame. If the current frame is lost, the second quantization-encoded data is obtained from the next frame of the current frame and the second quantization-encoded data is decoded to obtain the audio data associated with the current frame. Therefore, the transmission terminal is not required to retransmit the entire lost data frame, thus having relatively less impact on network latency, in some embodiments. For example, the second quantization-encoded data comes directly from encoding the audio data. Obtaining the audio data associated with the current frame based on decoding the second quantization-encoded data can yield good restoration quality of the decoded audio data, in certain embodiments.

In one embodiment, the method 500 further includes, before obtaining the second quantization-encoded data, reading preset redundant coded flags from the audio data stream. For example, if the redundant coded flags are effective, the second quantization-encoded data is obtained. Otherwise, the second quantization-encoded data is obtained. As an example, upon receiving the audio data stream, the decoding terminal can first read the redundant coded flags in the stream and easily determine whether to perform frame-loss-compensation based on the redundant coded flags.

In another embodiment, the current frame of the audio data stream also includes the first spectral-band-replication encoded data corresponding to the audio data associated with the current frame, and the next frame of the audio data stream also includes the second spectral-band-replication encoded data corresponding to the audio data associated with the current frame. For example, the method 500 further includes: if the current frame is not lost, obtaining the first spectral-band-replication encoded data from the current frame, and performing band recovery on the audio data associated with the current frame based on the first spectral-band-replication encoded data; if the current frame of the audio data stream is lost, obtaining the second spectral-band-replication encoded data from the next frame, and performing band recovery on the audio data based on the second spectral-band-replication encoded data. As an example, spectral-band-replication encoded data refers to a set of parameters obtained through spectral-band-replication encoding. As another example, to save bandwidth, the encoding terminal converts audio signals to low-frequency signals for transmission. As an example, the spectral-band-replication encoded data obtained through the spectral-band-replication encoding is added to the audio data stream to be transmitted. In another example, when the spectral-bandreplication encoded data is being decoded at the decoding terminal, the decoding terminal can restore the audio signals to high-frequency signals based on the spectral-band-replication encoded data.

In yet another embodiment, if the current frame of the audio data stream is not lost, the first quantization-encoded data and the first spectral-band-replication encoded data can be extracted from the current frame of the audio data stream, then decoding can be carried out to obtain the audio data associated with the current frame corresponding to the first quantization-encoded data and band recovery can be carried out on the audio data based on the first spectral-band-replication encoded data. For example, if the current frame of the audio data stream is lost, the decoding terminal can extract the second quantization-encoded data and the second spectral-band-replication encoded data from the next frame, perform decoding to obtain the audio data associated with the current frame corresponding to the second quantization-encoded data and perform band recovery on the audio data based on the second spectral-band-replication encoded data.

In yet another embodiment, the current frame of the audio data stream also includes the first stereo-encoded data corresponding to the audio data associated with the current frame, and the next frame of the audio data stream also includes the second stereo-encoded data corresponding to the audio data associated with the current frame. For example, the method 500 further includes: if the current frame is not lost, obtaining the first stereo-encoded data from the current frame and performing stereo restoration on the audio data associated with the current frame based on the first stereo-encoded data; if the current frame is lost, obtaining the second stereo-encoded data from the next frame of the current frame and performing stereo restoration on the audio data associated with the current frame based on the second stereo-encoded data. As an example, stereo-encoded data includes audio-signal-strength difference of different audio channels (e.g., two or more channels), correlation information etc. For example, if the current frame of the audio data stream is not lost, the first quantization-encoded data and the first stereo-encoded data can be extracted from the current frame of the audio data stream, then decoding can be carried out to obtain the audio data associated with the current frame corresponding to the first quantization-encoded data and stereo restoration can be carried out on the audio data based on the first stereo-encoded data. In another example, if the current frame of the audio data stream is lost, the second quantization-encoded data and the second stereo-encoded data can be extracted from the next frame, then decoding can be carried out to obtain the audio data associated with the current frame corresponding to the second quantization-encoded data and stereo restoration can be carried out on the audio data based on the second stereo-encoded data.

In some embodiments, the current frame of the audio data stream includes the first quantization-encoded data, the first spectral-band-replication encoded data and the first stereo-encoded data corresponding to the audio data associated with the current frame, and the next frame of the audio data stream also includes the second quantization-encoded data, the second spectral-band-replication encoded data and the second stereo-encoded data corresponding to the audio data associated with the current frame. For example, if the current frame is not lost after the decoding terminal receives the audio data stream, the decoding terminal obtains the first quantization-encoded data, the first spectral-band-replication encoded data and the first stereo-encoded data from the current frame, perform decoding to obtain the audio data associated with the current frame and subsequently perform band recovery and stereo restoration on the audio data associated with the current frame. In another example, if the current frame is lost, the decoding terminal can obtain the second quantization-encoded data, the second spectral-band-replication encoded data and the second stereo-encoded data from the next frame of data, perform decoding to obtain the audio data associated with the current frame and subsequently perform band recovery and stereo restoration on the audio data associated with the current frame.

Figure 6:
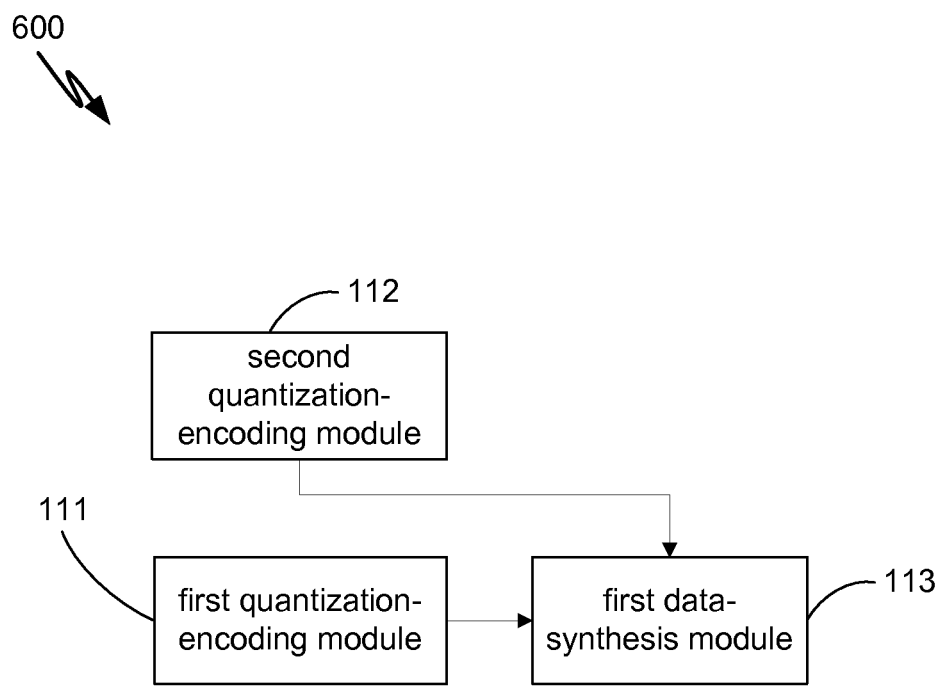
FIG. 6 is a simplified diagram showing a system for audio encoding according to one embodiment of the present invention.

FIG. 6 is a simplified diagram showing a system for audio encoding according to one embodiment of the present invention. This diagram is merely an example, which should not unduly limit the scope of the claims. One of ordinary skill in the art would recognize many variations, alternatives, and modifications. The audio-encoding system 600 includes: a first quantization-encoding module 111, a second quantization-encoding module 112, and a first data-synthesis module 113.

According to one embodiment, the first quantization-encoding module 111 is configured to perform first quantization encoding on audio data associated with a current frame of an audio data stream to obtain first quantization-encoded data. For example, the second quantization-encoding module 112 is configured to perform second quantization encoding on the audio data to obtain second quantization-encoded data. In another example, the first data-synthesis module 113 is configured to couple the first quantization-encoded data to the current frame of the audio data stream, and couple the second quantization-encoded data to a next frame of the audio data stream.

According to another embodiment, two quantization encoding processes are carried out on the audio data, and the encoded data obtained from the two quantization encoding processes are coupled to the current frame and the next frame of the audio data stream. For example, when a decoding terminal discovers packet loss associated with the current frame, the decoding terminal can still obtain the current frame of the audio data by decoding the second quantization-encoded data in the next frame, and the retransmission of the entire lost frame of audio data is not necessary, which results in little impact on network latency and satisfactory restoration quality of the audio data.

According to yet another embodiment, the first quantization-encoding module 111 and the second quantization-encoding module 112 are configured to perform the first quantization encoding and the second quantization encoding respectively on the audio data. For example, the first quantization encoding and/or the second quantization encoding includes various audio data quantization methods. As an example, the audio data includes mono audio data, stereo audio data and audio data obtained under different sampling rates with different frame lengths. For example, the first quantization encoding and the second quantization encoding are implemented based on a preset bit rate and a preset encoding bandwidth, and the first quantization-encoded data and the second quantization-encoded data represent core encoding information of the audio data. Thus, the corresponding audio data can be obtained by decoding either the first quantization-encoded data or the second quantization-encoded data, in some embodiments.

In one embodiment, the bit rates and the encoding bandwidths of the first quantization encoding and the second quantization encoding are generally set based on certain parameters, such as the bandwidth of a transmission channel and processing capacity of a transmission terminal and a reception terminal. As an example, the bit rate of the first quantization encoding is set to be larger than the bit rate of the second quantization encoding. Therefore, the number of bits in the second quantization-encoded data obtained from the second quantization encoding is less than the number of bits in the first quantization-encoded data obtained from the first quantization encoding, in certain embodiments. For example, the second quantization-encoded data is coupled to the next data frame of the audio data stream in the form of FEC (Forward Error Concealment) data and the second quantization-encoded data has less number of bits. Thus, including the second quantization-encoded data in the audio data stream does not significantly increase the occupancy of the communication bandwidth, and the audio data can still be accurately recovered in the case of data frame loss.

In another embodiment, frequency-domain-encoding bandwidths of both the first quantization-encoded data and the second quantization-encoded data are the same, thus there is not much audible differences between audio data obtained through the decoding of the second quantization-encoded data and audio data obtained through the decoding of the first quantization-encoded data. For example, even if any data packets are lost during the transmission of the audio data, the decoding terminal is still able to receive good-quality audio data. As an example, the bit rate of the first quantization encoding is set to be larger than the bit rate of the second quantization encoding, and the frequency-domain-encoding bandwidths of both the first quantization encoding and the second quantization encoding are the same, so as to ensure that the occupancy of the communication bandwidth would not increase significantly and the decoding terminal receives good-quality audio data.

In yet another embodiment, the system 600 further includes a QMF module configured to, before the first quantization encoding and the second quantization encoding are performed, perform QMF filtering on the audio data to decompose the audio data into one or more sub-bands. For example, while the first quantization encoding and the second quantization encoding are carried out on each sub-band, coding-high-pass sub-bands of both the first quantization encoding and the second quantization encoding are the same. As an example, in operation, the QMF module is configured to decompose time-domain signals related to the audio data into several sub-bands (e.g., 64 sub-bands) using a QMF filter bank to ensure that the coding-high-pass sub-bands (i.e., Band_high) of the first quantization encoding and the second quantization encoding are the same under different coding bit rates. As another example, the encoding bandwidths of the first quantization encoding and the second quantization encoding are the same, where the encoding bandwidth=(Band_high*sampling rate/total number of sub-bands+1)>>1.

In some embodiments, the system 600 further includes pre-processing sub-modules, such as a down-mixing sub-module configured to perform down-mixing on the audio data, a down-sampling sub-module configured to perform down-sampling on the audio data, and/or a discrete-cosine-transform sub-module configured to perform MDCT on the audio data to transform the audio signals from the time domain to the frequency domain. As an example, through these pre-processing sub-modules, stereo audio signals are transformed into mono audio signals through down-mixing in order to facilitate the extraction of core coding information during the encoding process. As another example, through down-sampling (e.g., twice down-sampling), the sampling rate of the audio data can be lowered and the burden on the bandwidths during data transmission can be reduced. The audio data is transformed from the time domain to the frequency domain through MDCT so as to make it more suitable for encoding applications and improve the quality and efficiency of audio encoding, in some embodiments.

In certain embodiments, the first data-synthesis module 113 is configured to couple the first quantization-encoded data corresponding to the audio data associated with the current frame to the current frame of the audio data stream. For example, if there is no frame loss when the decoding terminal receives the audio data stream, the decoding terminal can extract the first quantization-encoded data from the current frame of the audio data stream and decode the first quantization-encoded data to obtain the audio data corresponding to the current frame. As an example, the second quantization-encoded data corresponding to the audio data associated with the current frame is coupled to the next frame of the audio data stream. As another example, if the current frame is lost when the decoding terminal receives the audio data stream, the decoding terminal can extract the second quantization-encoded data from the next frame of current frame and decode the second quantization-encoded data to obtain the corresponding audio data associated with the current frame. In yet another example, redundant coded flags can be further set up in the audio data stream during the generation of the audio data stream. After receiving the audio data stream, the decoding terminal can first read the redundant coded flags in the stream and determine whether frame-loss-compensation encoding has been performed at the encoding terminal based on the redundant coded flags, so that the decoding terminal can select an appropriate decoding method.

Figure 7:
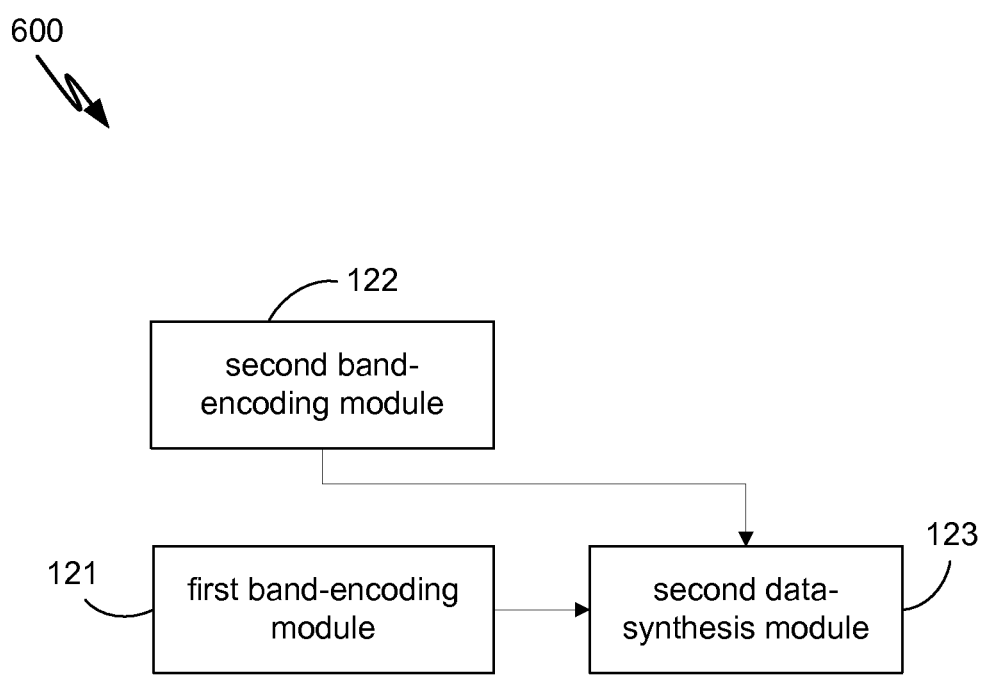
FIG. 7 is a simplified diagram showing a system for audio encoding according to another embodiment of the present invention.

FIG. 7 is a simplified diagram showing the system 600 for audio encoding according to another embodiment of the present invention. This diagram is merely an example, which should not unduly limit the scope of the claims. One of ordinary skill in the art would recognize many variations, alternatives, and modifications. The audio-encoding system 600 further includes: a first band-encoding module 121, a second band-encoding module 122, and a second data-synthesis module 123.

According to one embodiment, the first band-encoding module 121 is configured to perform spectral-band-replication encoding on the audio data to obtain first spectral-band-replication encoded data. For example, the second band-encoding module 122 is configured to perform second spectral-band-replication encoding on the audio data to obtain second spectral-band-replication encoded data. In another example, the second data-synthesis module 123 is configured to couple the first spectral-band-replication encoded data corresponding to the audio data associated with the current frame to the current frame of the audio data stream and couple the second spectral-band-replication encoded data corresponding to the audio data associated with the current frame to the next frame of the audio data stream.

According to another embodiment, the spectral-band-replication encoded data refers to a set of parameters obtained after performing the spectral-band-replication encoding. For example, to save bandwidth, the encoding terminal converts audio signals to low-frequency signals for transmission. As an example, the spectral-band-replication encoded data obtained through the spectral-band-replication encoding is added to the audio data stream to be transmitted. In another example, when the spectral-band-replication encoded data is being decoded at the decoding terminal, the decoding terminal can restore the audio signals to high-frequency signals based on the spectral-band-replication encoded data.

According to yet another embodiment, the first band-encoding module 121 and the second band-encoding module 122 perform the first spectral-band-replication encoding and the second spectral-band-replication encoding on the audio data to obtain the first spectral-band-replication encoded data and the second spectral-band-replication encoded data respectively. For example, the second data-synthesis module 123 is configured to couple the first spectral-band-replication encoded data corresponding to the audio data associated with the current frame to the current frame of the audio data stream and couple the second spectral-band-replication encoded data corresponding to the audio data associated with the current frame to the next frame of the audio data stream. In another example, if the current frame of the audio data stream is not lost, the decoding terminal can extract the first quantization-encoded data and the first spectral-band-replication encoded data from the current frame of the audio data stream, perform decoding to obtain the audio data associated with the current frame corresponding to the first quantization-encoded data and perform band recovery on the audio data based on the first spectral-band-replication encoded data. In yet another example, if the current frame of the audio data stream is lost, the decoding terminal can extract the second quantization-encoded data and the second spectral-band-replication encoded data from the next frame, perform decoding to obtain the audio data associated with the current frame corresponding to the second quantization-encoded data and perform band recovery on the audio data based on the second spectral-band-replication encoded data. In yet another example, the bit rate of the first spectral-band-replication encoding is larger than the bit rate of the second spectral-band-replication encoding. In yet another example, the frequency-domain-encoding bandwidths of both the first spectral-band-replication encoding and the second spectral-band-replication encoding are the same.

In some embodiments, as the bit rate of the first spectral-band-replication encoding is larger than the second spectral-band-replication encoding, the number of bits in the second spectral-band-replication encoded data obtained through the second spectral-band-replication encoding is less than the number of bits in first spectral-band-replication encoded data obtained through the first spectral-band-replication encoding, and thus the second spectral-band-replication encoded data takes up less communication bandwidth. For example, as the frequency encoding bandwidths of both the first spectral-band-replication encoding and second spectral-band-replication encoding are the same, spectral-band-replication data obtained from decoding the first spectral-band-replication encoded data and spectral-band-replication data obtained from decoding the second spectral-band-replication encoded data are basically the same. Thus, even if packet loss occurs in audio-data transmission, the decoding terminal can still obtain good-quality audio data.

Figure 8:
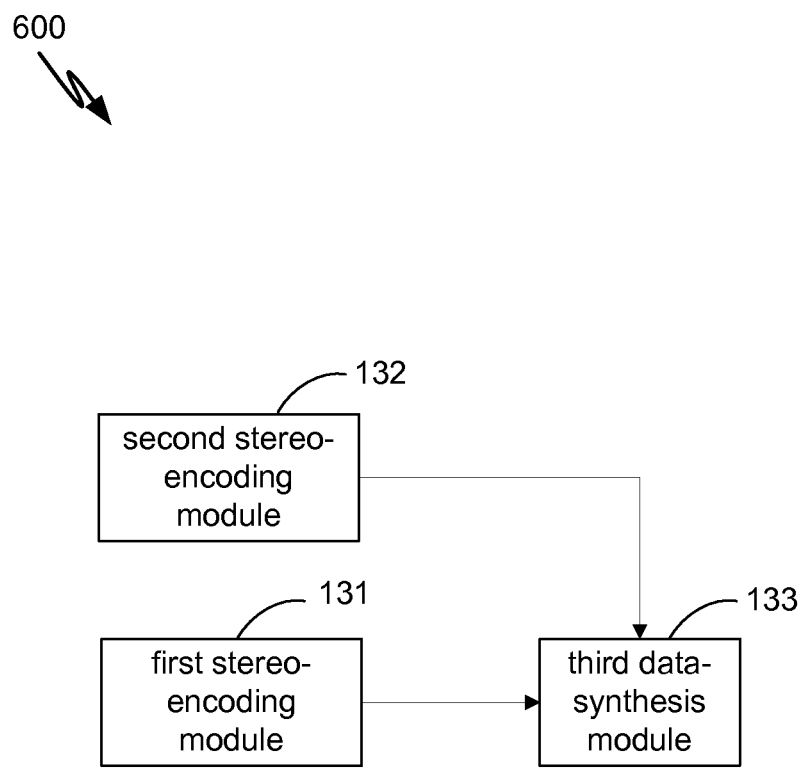
FIG. 8 is a simplified diagram showing a system for audio encoding according to yet another embodiment of the present invention.

FIG. 8 is a simplified diagram showing the system 600 for audio encoding according to yet another embodiment of the present invention. This diagram is merely an example, which should not unduly limit the scope of the claims. One of ordinary skill in the art would recognize many variations, alternatives, and modifications. The audio-encoding system 600 further includes: a first stereo-encoding module 131, a second stereo-encoding module 132, and a third data-synthesis module 133.

According to one embodiment, the first stereo-encoding module 131 is configured to perform first stereo encoding on the audio data to obtain first stereo-encoded data. For example, the second stereo-encoding module 132 is configured to perform second stereo encoding on the audio data to obtain second stereo-encoded data. In another example, the third data-synthesis module 133 is configured to couple the first stereo-encoded data corresponding to the audio data associated with the current frame to the current frame of the audio data stream, and couple the second stereo-encoded data corresponding to the audio data associated with the current frame to the next frame of the audio data stream.

According to another embodiment, stereo-encoded data includes audio-signal-strength difference of different audio channels (e.g., two or more channels), correlation information etc. For example, if the current frame of the audio data stream is not lost, the first quantization-encoded data and the first stereo-encoded data can be extracted from the current frame of the audio data stream, then decoding can be carried out to obtain the audio data associated with the current frame corresponding to the first quantization-encoded data and stereo restoration can be carried out on the audio data based on the first stereo-encoded data. In another example, if the current frame of the audio data stream is lost, the second quantization-encoded data and the second stereo-encoded data can be extracted from the next frame, then decoding can be carried out to obtain the audio data associated with the current frame corresponding to the second quantization-encoded data and stereo restoration can be carried out on the audio data based on the second stereo-encoded data.

According to yet another embodiment, the system 600 includes the first quantization-encoding module 111, the first band-encoding module 121 and the first stereo-encoding module 131, which are configured to perform the first quantization encoding, the first spectral-band-replication encoding and the first stereo encoding respectively on the audio data. For example, the system 600 further includes the second quantization-encoding module 112, the second band-encoding module 122 and the second stereo-encoding module 132, which are configured to perform the second quantization encoding, the second spectral-band-replication encoding and the second stereo encoding respectively on the audio data. In another example, the system 600 further includes the first data-synthesis module 113, the second data-synthesis module 123 and the third data-synthesis module 133, which are configured to couple the first quantization-encoded data, the first spectral-band-replication encoded data and the first stereo-encoded data respectively to the current frame of the audio data stream, and couple the second quantization-encoded data, the second spectral-band-replication encoded data and the second stereo-encoded data respectively to the next frame of the audio data stream.

Figure 9:
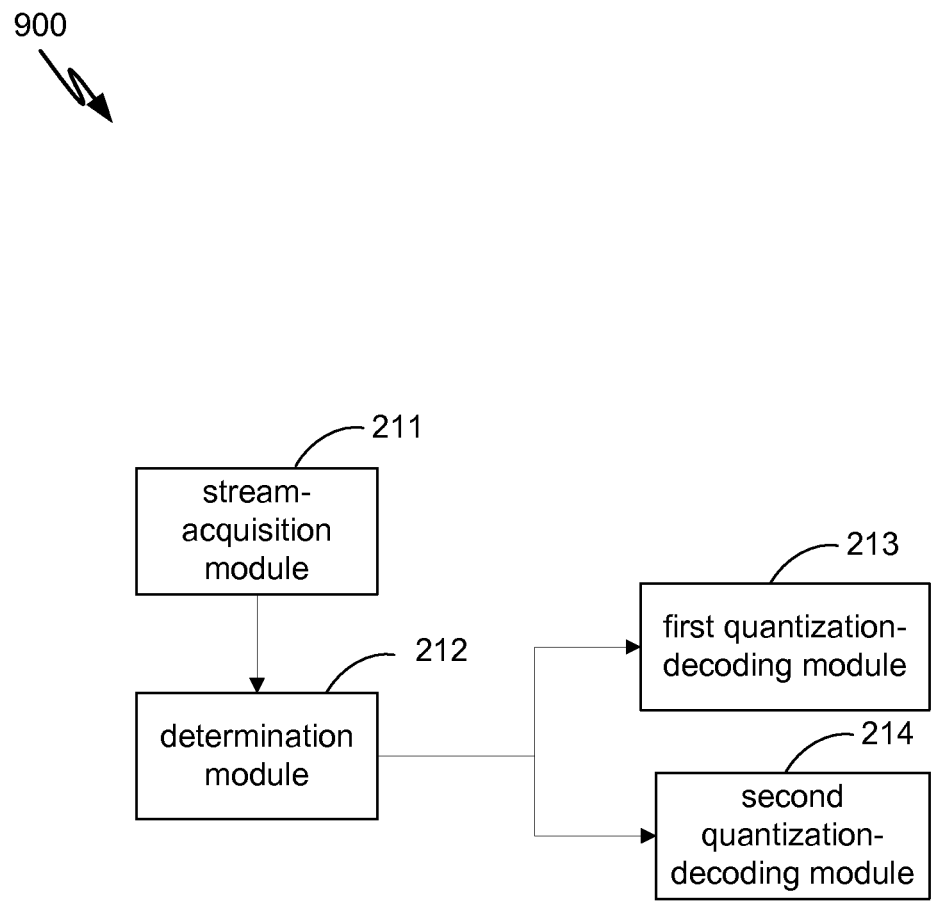
FIG. 9 is a simplified diagram showing a system for audio decoding according to one embodiment of the present invention.

FIG. 9 is a simplified diagram showing a system for audio decoding according to one embodiment of the present invention. This diagram is merely an example, which should not unduly limit the scope of the claims. One of ordinary skill in the art would recognize many variations, alternatives, and modifications. The audio-decoding system 900 includes: a stream-acquisition module 211, a determination module 212, a first quantization-decoding module 213, and a second quantization-decoding module 214.

According to one embodiment, the stream-acquisition module 211 is configured to obtain an audio data stream, a current frame of the audio data stream including first quantization-encoded data corresponding to audio data associated with the current frame, a next frame of the audio data stream including second quantization-encoded data corresponding to the audio data associated with the current frame.

For example, the determination module 212 is configured to determine whether the current frame of the audio data stream is lost. In another example, the first quantization-decoding module 213 configured to, if the current frame is not lost, obtain the first quantization-encoded data from the current frame of the audio data stream and decoding the first quantization-encoded data to obtain the audio data associated with the current frame. In yet another example, the second quantization-decoding module 214 configured to, if the current frame is lost, obtain the second quantization-encoded data from the next frame of the audio data stream and decoding the second quantization-encoded data to obtain the audio data associated with the current frame.

According to another embodiment, the stream-acquisition module 211 obtains the audio data stream. For example, the audio data stream includes the first quantization-encoded data and the second quantization-encoded data which are obtained after the encoding terminal separately carries out the first quantization encoding and the second quantization encoding on audio data. As an example, the first quantization-encoded data corresponding to the audio data associated with the current frame is coupled to the current frame of the audio data stream, and the second quantization-encoded data is coupled to the next frame of the audio data stream. In another example, the second quantization-encoded data corresponds to the FEC (Forward Error Concealment) data of the audio data. In yet another example, when the first quantization-encoded data is lost, the audio data may be obtained through decoding the second quantization-encoded data.

According to yet another embodiment, the determination module 212 determines whether the current frame of the audio data stream obtained is lost. For example, the determination of whether the current frame of the audio data stream is lost can be carried out by reading the frame loss flag of the audio data stream, or through other known methods. As an example, a commonly used frame loss flag is m_prev_lost_flag, where m_prev_lost_flag=0 indicates that the previous frame is not lost and m_prev_lost_flag=1 indicates that the previous frame is lost. Therefore, the determination of whether the current frame is lost can be carried out by determining whether the frame loss flag, m_prev_lost_flag, is equal to 1 upon receiving the next frame, in some embodiments.

In another embodiment, the decoding terminal is configured to delay outputting the audio data by 1 frame. For example, upon receiving the next frame of the audio data stream, then the decoding terminal decodes to obtain the audio data associated with the current frame. As an example, the process for obtaining the audio data associated with the current frame includes: storing the current frame of the audio data stream; upon reception of the next frame of the audio data stream, obtaining the first quantization-encoded data from the stored current frame of the audio data stream and decoding the first quantization-encoded data to obtain the audio data associated with the current frame.

In yet another embodiment, if the current frame corresponds to a first frame of the audio data stream, the output of the decoding terminal includes all 0 data. For example, upon reception of the audio data stream, it is determined whether the current frame is the first frame and the determination may be carried out based on whether another flag, m_first_frame_dec_flag, of the audio data stream is 1. As an example, if m_first_frame_dec_flag=1, it indicates that the current frame is the first frame of data, then the current frame is stored and the output includes all 0 data. If m_first_frame_dec_flag=0, it indicates that the current frame is not the first frame of data, then further determination is carried out to check whether m_prev_lost_flag is 0. In another example, if m_prev_lost_flag=1, the second quantization-encoded data is obtained from the next frame and decoded to obtain the audio data associated with the current frame and m_prev_lost_flag is shift backward by 1 bit. In yet another example, if m_prev_lost_flag=0, the first quantization-encoded data is obtained from the current frame and decoded to obtain the audio data associated with the current frame and m_prev_lost_flag is shift backward by 1 bit. Delaying the audio data output from the decoding terminal by one frame can reduce the occurrence of audio interruptions caused by packet loss, in some embodiments. For example, if both the current frame and the next frame of the audio data stream are lost, waveform interpolation, packet duplication or model-based recovery may be adopted to perform packet loss compensation on the audio data associated with the current frame.

According to one embodiment, the audio-decoding system 900 first determines whether the current frame of the audio data stream received is lost. For example, if the current frame is not lost, the first quantization-encoded data is directly obtained from the current frame and decoded to obtain the audio data associated with the current frame. If the current frame is lost, the second quantization-encoded data is obtained from the next frame of the current frame and the second quantization-encoded data is decoded to obtain the audio data associated with the current frame. Therefore, the transmission terminal is not required to retransmit the entire lost data frame, thus having relatively less impact on network latency, in some embodiments. For example, the second quantization-encoded data comes directly from encoding the audio data. Obtaining the audio data associated with the current frame based on decoding the second quantization-encoded data can yield good restoration quality of the decoded audio data, in certain embodiments.

According to another embodiment, the audio-decoding system 900 further includes: a flag reading module configured to read preset redundant coded flags from the audio data stream. For example, if the redundant coded flags are effective, the second quantization-encoded data is obtained. Otherwise, the second quantization-encoded data is obtained. As an example, upon receiving the audio data stream, the decoding terminal can first read the redundant coded flags in the stream and easily determine whether to perform frame-loss-compensation based on the redundant coded flags.

Figure 10:
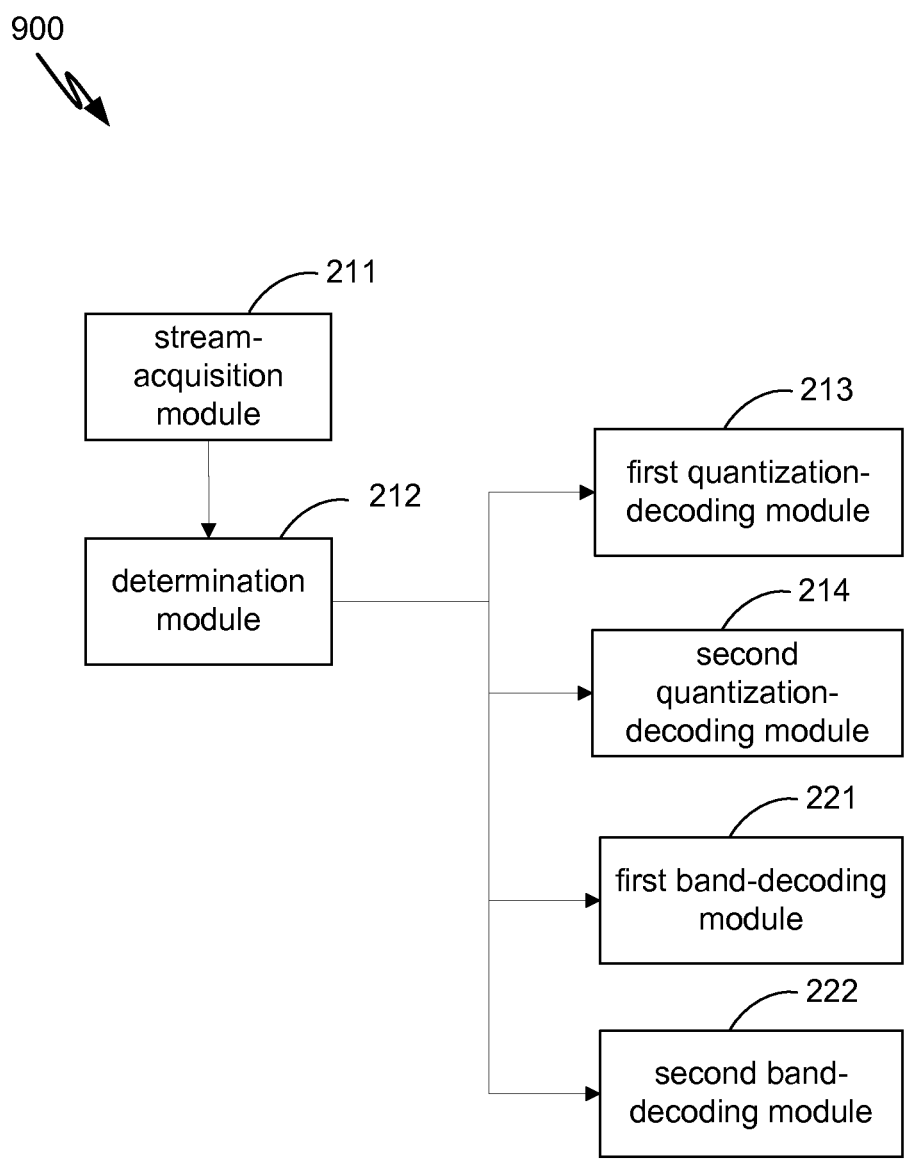
FIG. 10 is a simplified diagram showing a system for audio decoding according to another embodiment of the present invention.

FIG. 10 is a simplified diagram showing the system 900 for audio decoding according to another embodiment of the present invention. This diagram is merely an example, which should not unduly limit the scope of the claims. One of ordinary skill in the art would recognize many variations, alternatives, and modifications. The audio-decoding system 900 further includes: a first band-decoding module 221, and a second band-decoding module 222.

According to one embodiment, the first band-decoding module 221 is configured to, if the current frame is not lost, obtain the first spectral-band-replication encoded data from the current frame and perform band recovery on the audio data associated with the current frame based on the first spectral-band-replication encoded data. For example, the second band-decoding module 222 is configured to, if the current frame is lost, obtain the second spectral-band-replication encoded data from the next frame and perform band recovery on the audio data associated with the current frame based on the second spectral-band-replication encoded data.

According to another embodiment, spectral-band-replication encoded data refers to a set of parameters obtained through spectral-band-replication encoding. As an example, to save bandwidth, the encoding terminal converts audio signals to low-frequency signals for transmission. As an example, the spectral-band-replication encoded data obtained through the spectral-band-replication encoding is added to the audio data stream to be transmitted. In another example, when the spectral-band-replication encoded data is being decoded at the decoding terminal, the decoding terminal can restore the audio signals to high-frequency signals based on the spectral-band-replication encoded data.

According to yet another embodiment, if the current frame of the audio data stream is not lost, the first quantization-encoded data and the first spectral-band-replication encoded data can be extracted from the current frame of the audio data stream, then decoding can be carried out to obtain the audio data associated with the current frame corresponding to the first quantization-encoded data and band recovery can be carried out on the audio data based on the first spectral-band-replication encoded data. For example, if the current frame of the audio data stream is lost, the decoding terminal can extract the second quantization-encoded data and the second spectral-band-replication encoded data from the next frame, perform decoding to obtain the audio data associated with the current frame corresponding to the second quantization-encoded data and perform band recovery on the audio data based on the second spectral-band-replication encoded data.

Figure 11:
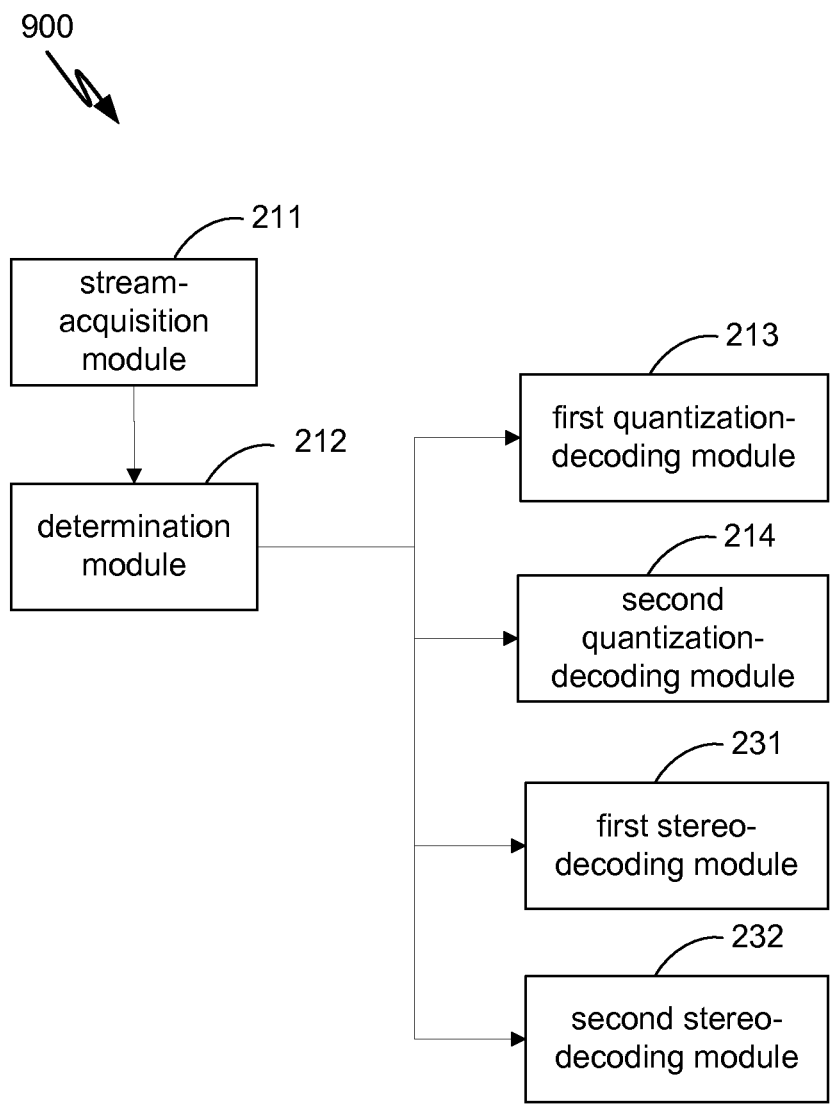
FIG. 11 is a simplified diagram showing a system for audio decoding according to yet another embodiment of the present invention.

FIG. 11 is a simplified diagram showing the system 900 for audio decoding according to yet another embodiment of the present invention. This diagram is merely an example, which should not unduly limit the scope of the claims. One of ordinary skill in the art would recognize many variations, alternatives, and modifications. The audio-decoding system 900 further includes: a first stereo-decoding module 231, and a second stereo-decoding module 232.

According to one embodiment, the first stereo-decoding module 231 is configured to, if the current frame is not lost, obtain the first stereo-encoded data from the current frame and perform stereo restoration on the audio data associated with the current frame based on the first stereo-encoded data. For example, the second stereo-decoding module 232 is configured to, if the current frame is lost, obtain the second stereo-encoded data from the next frame of the current frame and perform stereo restoration on the audio data associated with the current frame based on the second stereo-encoded data.

According to another embodiment, stereo-encoded data includes audio-signal-strength difference of different audio channels (e.g., two or more channels), correlation information etc. For example, if the current frame of the audio data stream is not lost, the first quantization-encoded data and the first stereo-encoded data can be extracted from the current frame of the audio data stream, then decoding can be carried out to obtain the audio data associated with the current frame corresponding to the first quantization-encoded data and stereo restoration can be carried out on the audio data based on the first stereo-encoded data. In another example, if the current frame of the audio data stream is lost, the second quantization-encoded data and the second stereo-encoded data can be extracted from the next frame, then decoding can be carried out to obtain the audio data associated with the current frame corresponding to the second quantization-encoded data and stereo restoration can be carried out on the audio data based on the second stereo-encoded data.

According to yet another embodiment, the system 900 includes the stream-acquisition module 211, the determination module 212, the first quantization-decoding module 213, the second quantization-decoding module 214, the first band-decoding module 221, the second band-decoding module 222, the first stereo-decoding module 231 and the second stereo-decoding module 232. For example, if the current frame is not lost after the decoding terminal receives the audio data stream, the decoding terminal obtains the first quantization-encoded data, the first spectral-band-replication encoded data and the first stereo-encoded data from the current frame, perform decoding to obtain the audio data associated with the current frame and subsequently perform band recovery and stereo restoration on the audio data associated with the current frame. In another example, if the current frame is lost, the decoding terminal can obtain the second quantization-encoded data, the second spectral-band-replication encoded data and the second stereo-encoded data from the next frame of data, perform decoding to obtain the audio data associated with the current frame and subsequently perform band recovery and stereo restoration on the audio data associated with the current frame.

According to another embodiment, a method is provided for audio encoding. For example, first quantization encoding is performed on audio data associated with a current frame of an audio data stream to obtain first quantization-encoded data; second quantization encoding is performed on the audio data to obtain second quantization-encoded data; the first quantization-encoded data is coupled to the current frame of the audio data stream; and the second quantization-encoded data is coupled to a next frame of the audio data stream. For example, the method is implemented according to at least FIG. 1, FIG. 2, and/or FIG. 3.

According to yet another embodiment, a method is provided for audio decoding. For example, an audio data stream, a current frame of the audio data stream including first quantization-encoded data corresponding to audio data associated with the current frame, a next frame of the audio data stream including second quantization-encoded data corresponding to the audio data associated with the current frame are obtained; whether the current frame of the audio data stream is lost is determined; in response to the current frame of the audio data stream not being lost, the first quantization-encoded data is obtained from the current frame of the audio data stream and the first quantization-encoded data is decoded to obtain the audio data associated with the current frame; in response to the current frame of the audio data stream being lost, the second quantization-encoded data is obtained from the next frame of the audio data stream and the second quantization-encoded data is decoded to obtain the audio data associated with the current frame. For example, the method is implemented according to at least FIG. 5.

According to yet another embodiment, an audio-encoding system includes: a first quantization-encoding module, a second quantization-encoding module, and a first data-synthesis module. The first quantization-encoding module is configured to perform first quantization encoding on audio data associated with a current frame of an audio data stream to obtain first quantization-encoded data. The second quantization-encoding module is configured to perform second quantization encoding on the audio data to obtain second quantization-encoded data. The first data-synthesis module is configured to couple the first quantization-encoded data to the current frame of the audio data stream and couple the second quantization-encoded data to a next frame of the audio data stream. For example, the system is implemented according to at least FIG. 6, FIG. 7, and/or FIG. 8.

In one embodiment, an audio-decoding system includes: a stream-acquisition module, a determination module, a first quantization-decoding module and a second quantization-decoding module. The stream-acquisition module is configured to obtain an audio data stream, a current frame of the audio data stream including first quantization-encoded data corresponding to audio data associated with the current frame, a next frame of the audio data stream including second quantization-encoded data corresponding to the audio data associated with the current frame. The determination module is configured to determine whether the current frame of the audio data stream is lost. The first quantization-decoding module is configured to, in response to the current frame of the audio data stream not being lost, obtain the first quantization-encoded data from the current frame of the audio data stream and decode the first quantization-encoded data to obtain the audio data associated with the current frame. The second quantization-decoding module is configured to, in response to the current frame of the audio data stream being lost, obtain the second quantization-encoded data from the next frame of the audio data stream and decode the second quantization-encoded data to obtain the audio data associated with the current frame. For example, the system is implemented according to at least FIG. 9, FIG. 10, and/or FIG. 11.

In another embodiment, a non-transitory computer readable storage medium includes programming instructions for audio encoding. The programming instructions are configured to cause one or more data processors to execute certain operations. For example, first quantization encoding is performed on audio data associated with a current frame of an audio data stream to obtain first quantization-encoded data; second quantization encoding is performed on the audio data to obtain second quantization-encoded data; the first quantization-encoded data is coupled to the current frame of the audio data stream; and the second quantization-encoded data is coupled to a next frame of the audio data stream. For example, the storage medium is implemented according to at least FIG. 1, FIG. 2, and/or FIG. 3.

In yet another embodiment, a non-transitory computer readable storage medium includes programming instructions for audio decoding. The programming instructions are configured to cause one or more data processors to execute certain operations. For example, an audio data stream, a current frame of the audio data stream including first quantization-encoded data corresponding to audio data associated with the current frame, a next frame of the audio data stream including second quantization-encoded data corresponding to the audio data associated with the current frame are obtained; whether the current frame of the audio data stream is lost is determined; in response to the current frame of the audio data stream not being lost, the first quantization-encoded data is obtained from the current frame of the audio data stream and the first quantization-encoded data is decoded to obtain the audio data associated with the current frame; in response to the current frame of the audio data stream being lost, the second quantization-encoded data is obtained from the next frame of the audio data stream and the second quantization-encoded data is decoded to obtain the audio data associated with the current frame. For example, the storage medium is implemented according to at least FIG. 5.

The above only describes several scenarios presented by this invention, and the description is relatively specific and detailed, yet it cannot therefore be understood as limiting the scope of this invention's patent. It should be noted that ordinary technicians in the field may also, without deviating from the invention's conceptual premises, make a number of variations and modifications, which are all within the scope of this invention. As a result, in terms of protection, the patent claims shall prevail.

For example, some or all components of various embodiments of the present invention each are, individually and/or in combination with at least another component, implemented using one or more software components, one or more hardware components, and/or one or more combinations of software and hardware components. In another example, some or all components of various embodiments of the present invention each are, individually and/or in combination with at least another component, implemented in one or more circuits, such as one or more analog circuits and/or one or more digital circuits. In yet another example, various embodiments and/or examples of the present invention can be combined.

Additionally, the methods and systems described herein may be implemented on many different types of processing devices by program code comprising program instructions that are executable by the device processing subsystem. The software program instructions may include source code, object code, machine code, or any other stored data that is operable to cause a processing system to perform the methods and operations described herein. Other implementations may also be used, however, such as firmware or even appropriately designed hardware configured to perform the methods and systems described herein.

The systems' and methods' data (e.g., associations, mappings, data input, data output, intermediate data results, final data results, etc.) may be stored and implemented in one or more different types of computer-implemented data stores, such as different types of storage devices and programming constructs (e.g., RAM, ROM, Flash memory, flat files, databases, programming data structures, programming variables, IF-THEN (or similar type) statement constructs, etc.). It is noted that data structures describe formats for use in organizing and storing data in databases, programs, memory, or other computer-readable media for use by a computer program.

The systems and methods may be provided on many different types of computer-readable media including computer storage mechanisms (e.g., CD-ROM, diskette, RAM, flash memory, computer's hard drive, etc.) that contain instructions (e.g., software) for use in execution by a processor to perform the methods' operations and implement the systems described herein.

The computer components, software modules, functions, data stores and data structures described herein may be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

The computing system can include client devices and servers. A client device and server are generally remote from each other and typically interact through a communication network. The relationship of client device and server arises by virtue of computer programs running on the respective computers and having a client device-server relationship to each other.

While this specification contains many specifics, these should not be construed as limitations on the scope or of what may be claimed, but rather as descriptions of features specific to particular embodiments. Certain features that are described in this specification in the context or separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A method for audio encoding, comprising:
   performing first quantization encoding on audio data associated with a current frame of an audio data stream to obtain first quantization-encoded data;
   performing second quantization encoding on the audio data to obtain second quantization-encoded data;
   coupling the first quantization-encoded data to the current frame of the audio data stream;
   coupling the second quantization-encoded data to a next frame of the audio data stream; and
   initiating transmission of the first quantization-encoded data and the second quantization-encoded data to a decoding terminal, the decoding terminal being configured to obtain the current frame of the audio data stream by decoding the second quantization-encoded data in the next frame to avoid retransmission of the current frame when there is packet loss during the transmission.

2. The method of claim 1, further comprising:
   performing first spectral-band-replication encoding on the audio data to obtain first spectral-band-replication encoded data;
   performing second spectral-band-replication encoding on the audio data to obtain second spectral-band-replication encoded data;
   coupling the first spectral-band-replication encoded data to the current frame of the audio data stream; and
   coupling the second spectral-band-replication encoded data to the next frame of the audio data stream.

3. A method for audio decoding, comprising:
   obtaining an audio data stream, a current frame of the audio data stream including first quantization-encoded data corresponding to audio data associated with the current frame and second quantization-encoded data corresponding to audio data associated with a frame immediately preceding the current frame, a next frame of the audio data stream including first quantization-encoded data corresponding to audio data associated with the next frame and second quantization-encoded data corresponding to the audio data associated with the current frame;
   determining whether the current frame of the audio data stream is lost;
   in response to the current frame of the audio data stream not being lost,
      obtaining the first quantization-encoded data from the current frame of the audio data stream; and
      decoding the first quantization-encoded data to obtain the audio data associated with the current frame;
   in response to the current frame of the audio data stream being lost,
      obtaining the second quantization-encoded data from the next frame of the audio data stream; and
      decoding the second quantization-encoded data to obtain the audio data associated with the current frame.

4. The method of claim 3, further comprising:
   in response to the current frame of the audio data stream not being lost,
      obtaining first spectral-band-replication encoded data from the current frame of the audio data stream, the first spectral-band-replication encoded data being included in the current frame of the audio data stream and corresponding to the audio data associated with the current frame; and
      performing band recovery on the audio data associated with the current frame based on at least information associated with the first spectral-band-replication encoded data;
   in response to the current frame of the audio data stream being lost,
      obtaining second spectral-band-replication encoded data from the next frame of the audio data stream, the second spectral-band-replication encoded data being included in the next frame of the audio data stream and corresponding to the audio data associated with the current frame; and
      performing band recovery on the audio data associated with the current frame based on at least information associated with the second spectral-band-replication encoded data.

5. A system for audio encoding, comprising:
   at least one data processor; and
   memory storing instructions which, when executed by the at least one data processor, result in operations comprising:
      performing first quantization encoding on audio data associated with a current frame of an audio data stream to obtain first quantization-encoded data;
      performing second quantization encoding on the audio data to obtain second quantization-encoded data;
      coupling the first quantization-encoded data to the current frame of the audio data stream;

coupling the second quantization-encoded data to a next frame of the audio data stream; and initiating transmission of the first quantization-encoded data and the second quantization-encoded data to a decoding terminal, the decoding terminal being configured to obtain the current frame of the audio data stream by decoding the second quantization-encoded data in the next frame to avoid retransmission of the current frame when there is packet loss during the transmission.

6. The system of claim 5, wherein the operations further comprise:

performing first spectral-band-replication encoding on the audio data to obtain first spectral-band-replication encoded data;

performing second spectral-band-replication encoding on the audio data to obtain second spectral-band-replication encoded data;

coupling the first spectral-band-replication encoded data to the current frame of the audio data stream; and coupling the second spectral-band-replication encoded data to the next frame of the audio data stream.

7. A system for audio decoding, comprising:

at least one data processor; and memory storing instructions which, when executed by the at least one data processor, result in operations comprising:

obtaining an audio data stream, a current frame of the audio data stream including first quantization-encoded data corresponding to audio data associated with the current frame and second quantization-encoded data corresponding to audio data associated with a frame immediately preceding the current frame, a next frame of the audio data stream including first quantization-encoded data corresponding to audio data associated with the next frame and second quantization-encoded data corresponding to the audio data associated with the current frame;

determining whether the current frame of the audio data stream is lost;

in response to the current frame of the audio data stream not being lost, obtaining the first quantization-encoded data from the current frame of the audio data stream; and decoding the first quantization-encoded data to obtain the audio data associated with the current frame;

in response to the current frame of the audio data stream being lost, obtaining the second quantization-encoded data from the next frame of the audio data stream; and decoding the second quantization-encoded data to obtain the audio data associated with the current frame.

8. The system of claim 7, wherein the operations further comprise:

in response to the current frame of the audio data stream not being lost, obtaining first spectral-band-replication encoded data from the current frame of the audio data stream, the first spectral-band-replication encoded data being included in the current frame of the audio data stream and corresponding to the audio data associated with the current frame; and performing band recovery on the audio data associated with the current frame based on at least information associated with the first spectral-band-replication encoded data;

in response to the current frame of the audio data stream being lost, obtaining second spectral-band-replication encoded data from the next frame of the audio data stream, the second spectral-band-replication encoded data being included in the next frame of the audio data stream and corresponding to the audio data associated with the current frame; and performing band recovery on the audio data associated with the current frame based on at least information associated with the second spectral-band-replication encoded data.

* * * * *